Oct. 29, 1935.  H. E. VEIT  2,018,749

DEFOAMER

Filed May 14, 1934   2 Sheets-Sheet 1

Inventor
HERMANN E. VEIT.
By Howard J. Whelan.
Attorney

Oct. 29, 1935.  H. E. VEIT  2,018,749
DEFOAMER
Filed May 14, 1934    2 Sheets-Sheet 2

Inventor
HERMANN E. VEIT.
By Howard J. Whelan.
Attorney

Patented Oct. 29, 1935

2,018,749

UNITED STATES PATENT OFFICE 2,018,749

DEFOAMER

Hermann E. Veit, Baltimore, Md., assignor of fifty per cent to Ernest H. Schmidt, Baltimore, Md.

Application May 14, 1934, Serial No. 725,619

3 Claims. (Cl. 225—5)

This invention refers to open beverage containers and more particularly to a dispenser for controlling the flow of a beverage from a spigot to the container in which it is being placed. It has among its objects to provide a dispenser that will so control the flow of beverage to the container that splashing, overflow of foam, and spilling will be prevented. Another object is to provide a dispenser for beer, carbonated waters, liquids under fermenting and other pressures and similar classes of liquids, that will not permit foam to spill over the top of the glass, or require several operations before filling is completed. A further object is to provide an additional adjustable regulation to suit predetermined conditions. Another object is to provide such a dispenser that will permit a container or glass to be filled at one "draw" and clean enough to be used for drinking out of. A still further object is to have this dispenser arranged to prevent damage to the containers that are placed for it to fill. Other objects will become apparent as the invention is more fully set forth.

In the practice of filling glasses with beer and similar foaming beverages, difficulty is experienced by reason of the immediate foaming of the liquor at pouring from a spigot. It fills the glass with beer gas bubbles and they in turn grow and overflow down the sides of the glass. This causes the glass to be wet and soiled on the outside uses up liquor that is not drunk and requires the use of a scraper to clear off and wipe the foam away from the top. It also necessitates the liquor being drawn from the spigot for a moment, then closed off until a certain amount of settlement takes place; then turned on again, and stopped; which process is repeated several times before the glass is properly filled with beer and foam. This process requires care, time and does not fill the glass satisfactorily. However, this invention overcomes this difficulty, and enables the glass to be filled with one "draw". This is accomplished by providing a cap which prevents the foam escaping and compresses same until the glass is filled to the proper extent with beer. The pressure of the foam is regulated in the glass through the use of a valve set at a predetermined pressure and giving off a signal when that pressure is reached, to warn and notify the operator. The dispenser consists in general of a cap attached to a conventional type of beer spigot. It closes flat on the glass to be filled and covers it securely so that the beer and foam cannot escape while being poured in. The valve works when the pressure from the foam has reached the proper point. The spigot is turned off by the operator. The excess pressure escapes from the valve and depressures the foam. The cap then may be raised and the glass of beer removed ready to be drunk without the foaming troubles. The arrangement is quicker, cleaner and provides a more sanitary method of presenting the glass to the customer. It also eliminates the customary wipe of the bar-operators cloth and full measure is given.

In the drawings which illustrate by way of example an embodiment of this invention:

Similar reference characters refer to similar parts throughout the drawings.

Figure 1:
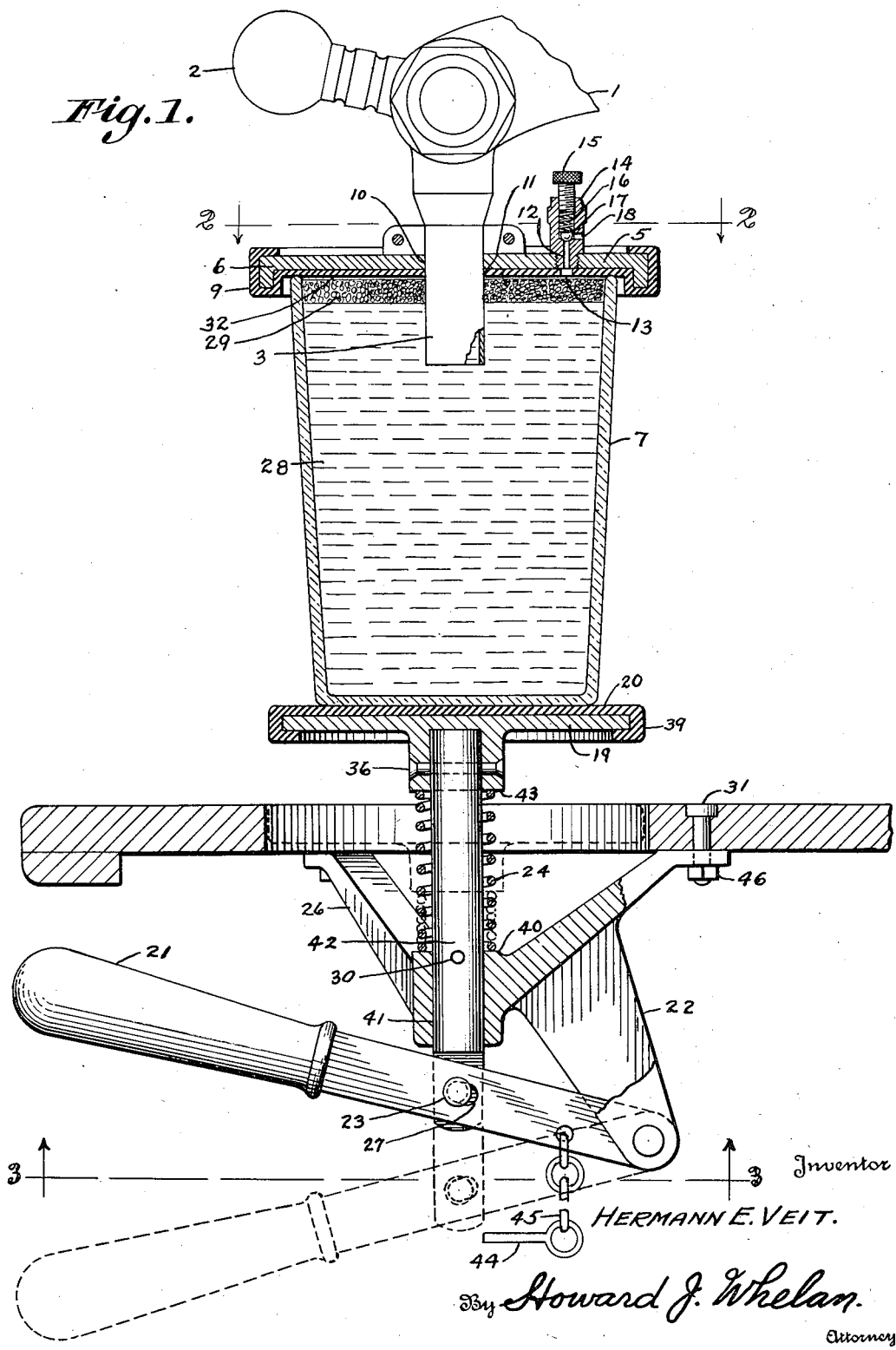
Figure 1 is a sectional elevation of a spigot with an attachment embodying this invention attached thereto.
Figure 2:
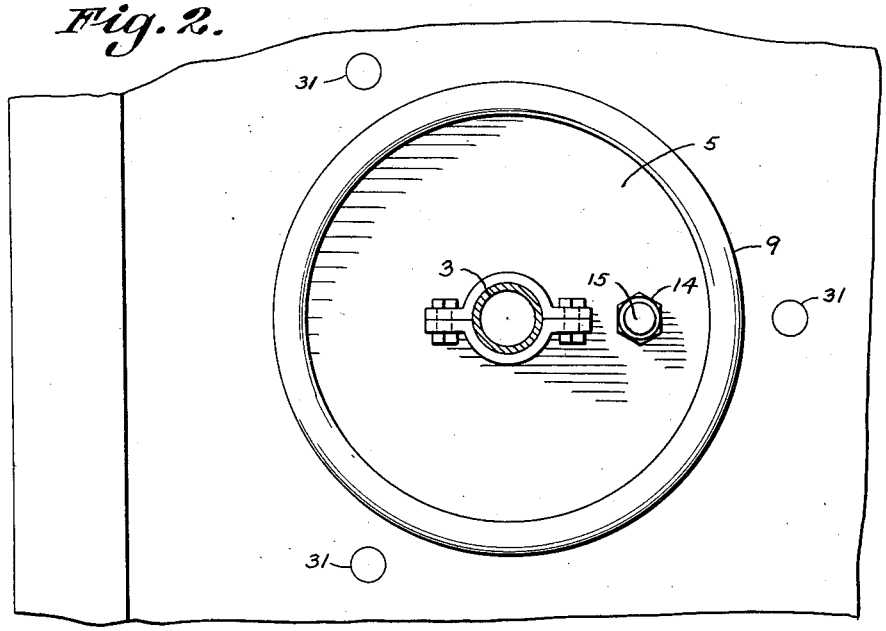
Figure 2 is a sectional view through Figure 1 along the line 2—2.
Figure 3:
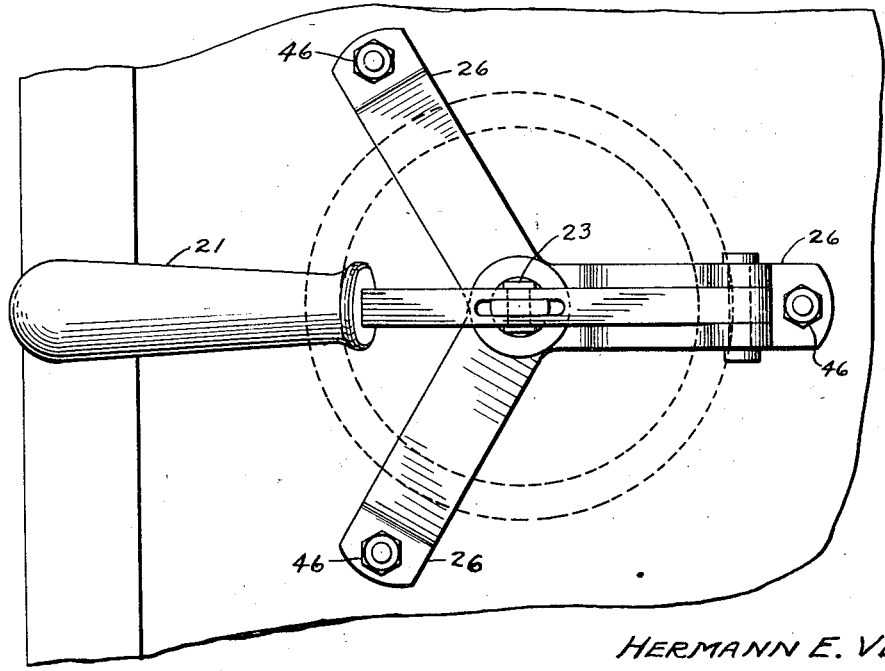
Figure 3 is a view of Figure 1 along the line 3—3.

In the construction shown, 1 represents a conventional form of beer spigot having a handle 2 and filling spout 3, and supports thereon a cap 5 which is preferably of circular form. Its periphery provided with a depending rim 6 larger in diameter than the glass or container 7 to be placed under it and the spigot for filling with beer. The cap is provided with a rubber protecting gasket 8 which is mounted as indicated and covers over the rim 6 as indicated with an annular buffer 9. This serves to protect glasses inserted under the device from damage if they happen to hit the protected rim. A central hole 10 is provided in the cap for the snug insertion of the spigot spout, and the hole 11 is in the gasket. A hole 12 in the coverplate, and a hole 13 in the gasket permits the air or gas under pressure in the glass getting access to a pressure valve 14 which is mounted on the cap and relieves the pressure when the same reaches the point to which the adjusting screw 15 is set for. A spring 16, ball 17, and outlet 18 are details of the construction of this valve. A shelf plate 19, with a rubber tray 20 on it serves as a rest and holder for the glass to be filled under the spigot. The shelf plate is also provided with an extension of the material of the tray over the sides to provide a bumper protector 39. A bracket 26 is preferably secured under the counter and has three arms as shown in the drawings. A central bearing 40, having a hole 41 through it is attached to the arms, and provides a guide for the movement of the stem 42. This stem 42 is attached to the shelf plate 19 by a pin or rivet 36 and serves to hold it for operative purposes. A coil spring 24 is under tension between the head 43 and central bearing 40 giving the shelf plate a resilient action. An arm 21 is fulcrumed on, a support 22 attached to the arms of the bracket and by means of a pin 23 and slot 27 reciprocates the stem 42 up and down through the passage 41. The stem 42 is provided with a hole 30 so when the shelf plate is pulled down flush with the counter surface a lock pin 44 on a chain 45 attached to the arm 21, is inserted through the hole 30 and locks the shelf plate down when not in use. Any suitable means, such as the screws 31 and nuts 46 may be used to support the bracket to the counter.

A description of the operation of the device will explain the construction more clearly.

In operation, the glass is placed on the tray 20 and arm 21 is pressed down, this causes the shelf plate 19 to move downwardly and permits the insertion of the filling spout 3.

The glass under the lifting action of the shelf mechanism is brought up against the cap gasket and is held tightly between both rubber gasket and tray. When positioned properly, it assumes an upright position with the spigot spout pointed down centrally in it. The handle of the spigot is operated and the beer rushes down the spout into the glass and fills same with beer 28 and foam 29, the foam being held within the glass and not allowed to escape (because of the cap gasket) is compressed until the pressure rises to a point where it opens the relief valve which is regulated to suit various conditions, the operator then closes off the spigot. The gases 32 in the foam escape and accumulate in the glass and some pass through the valve. The balance escapes easily and quietly from the glass when the shelf plate is lowered and the glass detached from the gasket and cover plate. The gases being free from the bubbles of beer by this time freely pass off, without causing foam to spill over the edge of the glass. At the same time, the bubbles or foam subsides sufficiently to level off at the top of the glass, until the film of bubbles releases the gas within them. The operation is quick; no time is lost repeating the opening and closing of the spigot several times because but one filling is made, with the foam kept in. Foam is not made after filling; but during the filling many bubbles are broken and release the gas, some of which stays in the liquor and improves the taste of same because it is absorbed therein and releases slowly. The handle 21 is operated quickly by reason of the spring 24, the rubber protecting gasket 8 closes on the glass to be filled in a very quiet and safe manner, while having the glass completely under control at all times. When the shelf mechanism is not being used it is closed down flush to the counter and locked out of the way. Accidental hitting of glasses against the shelf or cap does not cause injury because the rubber bumpers take up the shock harmlessly.

The manner of installing the device on the spigot is simple if separate therefrom. It may be also homogeneously attached in any well known manner, such as by welding or casting direct with the spigot. While rubber has been mentioned specifically, such material or substance is not exclusively intended. Any material or substances that have resilient and cushioning qualities and the other features suitable for the purpose involved may be used for the gasket and tray and bumpers.

While but one form of the invention is shown in the drawings, it is not desired to limit this application for patent to this particular form, or in any other way, otherwise than limited by the prior art, as it is appreciated that other forms of construction could be used, utilizing the same principles and coming within the scope of the appended claims.

I claim:—

1. A device of the class described comprising in combination a cap having an enlarged peripheral rim, a gasket for covering the cap and rim thereof, an adjustable relief valve on the cap vertically disposed above the same and having its orifice disposed through the cap and registering with a hole in said gasket, means for holding the cap in filling contact with a spout, a shelf plate for holding a container to be filled against the gasket and cap, a tray on the shelf plate for engaging the bottom of the container in a resilient and non-slipping manner, an arm for supporting the shelf plate and means for adjusting the position and sustaining pressure of said shelf plate against the container.

2. A defoamer for beer comprising in combination, a spigot device for serving beer under pressure, a cap attached to the spigot with the spout of the same passing through it, said cap having an enlarged rim thereon, a gasket of resilient material mounted on the cap and covering the said rim and extraneous projecting parts of the cap, a tray for supporting the under part of a container to be filled by the spigot, a shelf plate for supporting the tray and pressing the container with its open end against the gasket of the cap, means for adjusting the pressure of the shelf plate against the container, a movable arm for supporting the shelf plate, means for adjusting the arm, a pressure spring for adjusting the tension of the shelf plate and means for operating the shelf, arm and pressure spring and an adjustable pressure relief valve mounted directly on the said cap with its relief passage in registry with the bottom and the foam space of the container and spaced away from the said spigot and independent thereof.

3. A defoamer comprising in combination, a spigot having a relatively long filling spout, a relief pressure valve set for a predetermined pressure mounted adjacent to the said filling spout, a cap mounted adjustably on the filling spigot and carrying the said valve vertically disposed above it with the passage orifice therein extending to the under surface of the cap, a bumper member mounted on the cap and on the under surface thereof and peripheral edges and upper surface, a pressure shelf with resilient members for automatically lifting the same and a container to be placed thereon, and a resilient bumper mounted on the upper surface and peripheral edges and under surface thereof.

HERMANN E. VEIT.